(12) United States Patent
Whitehead

(10) Patent No.: US 8,352,224 B2
(45) Date of Patent: Jan. 8, 2013

(54) STRIPWISE CONSTRUCTION OF 3D CURVED SURFACES

(75) Inventor: Lorne A. Whitehead, Vancouver (CA)

(73) Assignee: The University of British Columbia, Vancouver, British Columbia (CA)

( * ) Notice: Subject to any disclaimer, the term of this patent is extended or adjusted under 35 U.S.C. 154(b) by 388 days.

(21) Appl. No.: 12/665,091

(22) PCT Filed: Jun. 16, 2008

(86) PCT No.: PCT/CA2008/001145
§ 371 (c)(1),
(2), (4) Date: Dec. 17, 2009

(87) PCT Pub. No.: WO2009/000071
PCT Pub. Date: Dec. 31, 2008

(65) Prior Publication Data
US 2010/0198562 A1    Aug. 5, 2010

Related U.S. Application Data

(60) Provisional application No. 60/945,653, filed on Jun. 22, 2007.

(51) Int. Cl.
*G06F 17/50* (2006.01)
(52) U.S. Cl. ........ 703/2; 703/1; 703/6; 52/848; 428/108
(58) Field of Classification Search .................. 703/2, 6, 703/1; 52/848; 428/108
See application file for complete search history.

(56) References Cited

U.S. PATENT DOCUMENTS

| | | | |
|---|---|---|---|
| 3,675,380 A | 7/1972 | Moss | |
| 5,285,320 A | 2/1994 | Hohberg | |
| 6,485,152 B2 | 11/2002 | Wood | |
| 6,950,787 B2 | 9/2005 | Hashima et al. | |
| 2005/0132312 A1 | 6/2005 | Sasaki | |
| 2009/0229220 A1* | 9/2009 | Gokkel | 52/848 |
| 2010/0233421 A1* | 9/2010 | Lind et al. | 428/108 |

FOREIGN PATENT DOCUMENTS

DE    20314372 U1    12/2003

(Continued)

OTHER PUBLICATIONS

Jan. 6, 2012 office action issued by the Korean Intellectual Property Office (KIPO) in respect of Applicant's corresponding Korean patent application No. 10-2010-7001500.

(Continued)

*Primary Examiner* — Thai Phan
(74) *Attorney, Agent, or Firm* — Oyen Wiggs Green & Mutala LLP

(57) ABSTRACT

A 3D structure approximating a 3D curved surface having non-zero Gaussian curvature over a portion of the surface. The structure is formed of a plurality of thin strips (10) which are simply deformed and aligned adjacent one another to approximate the 3D curved surface. Each strip has:
  zero Gaussian curvature;
  a strip width which varies by no more than ±10% along a longitudinal axis of the strip; and
  a predetermined flat shape such that, after simple deformation, adjacent edges of adjacent strips can be aligned substantially parallel to one another separated by a substantially small gap.

The aligned, simply deformed strips appear straight when viewed from a preferred viewing direction. The strips can be attached to a rigid support (12) at selected mounting points such that natural equilibrium deformation between the mounting points holds the aligned simply deformed strips in a desired approximation of the 3D curved surface.

15 Claims, 3 Drawing Sheets

FOREIGN PATENT DOCUMENTS

| | | |
|---|---|---|
| JP | 2001-186309 A | 7/2001 |
| JP | 2002-140372 A | 5/2002 |
| JP | 2005-173963 A | 6/2005 |
| JP | 2006-312284 A | 11/2006 |

OTHER PUBLICATIONS

Oct. 25, 2011 office action issued by the Japanese Patent Office (JPO) in respect of Applicant's corresponding Japanese patent application No. 2010-511462.

"A New Device for Distributing Concentrated Sunlight in Building Interiors", Whitehead et al., Energy and Buildings 6 (1984) pp. 119-125.

"A Cost-Effective Approach to Core Daylighting", Whitehead et al., 2nd Canadian Solar Buildings Conference, Calgary, Jun. 10-14, 2007, pp. 1-6.

"A Cost-Effective Solution for Core Daylighting in Office Buildings", Rosemann et al., American Solar Energy Society Solar Conference, 2006, pp. 1-6.

* cited by examiner

10

STRIPWISE CONSTRUCTION OF 3D CURVED SURFACES

REFERENCE TO RELATED APPLICATION

This application claims the benefit of U.S. provisional patent application Ser. No. 60/945,653 filed 22 Jun. 2007.

TECHNICAL FIELD

This disclosure concerns construction of three dimensional (3D) curved surfaces using two-dimensional (2D) strips which can be deformed and aligned to yield a discrete approximation of the desired 3D surface.

BACKGROUND 3D curved surfaces having paraboloidal or other shapes are used for various purposes, e.g. as non-planar mirrors, in architectonics, etc. 3D curved surfaces can be formed using manufacturing techniques such as injection molding or water forming. However, maintaining or applying a highly reflective mirror finish on the surface of a paraboloid or other 3D curved surface can be problematic, potentially making such techniques prohibitively expensive. Comparatively cost-effective construction of a 3D structure approximating a selected 3D curved surface is disclosed below.

DESCRIPTION

Throughout the following description, specific details are set forth in order to provide a more thorough understanding of the disclosure. In some instances, well known elements have not been shown or described in detail to avoid unnecessarily obscuring the disclosure. Accordingly, the specification and drawings are to be regarded in an illustrative, rather than a restrictive, sense.

It is useful to recall that the "Gaussian curvature" of a point on a curved surface is the product of the two principal curvatures at that point. For example, at any point on the surface of a sphere, there is curvature in two directions, so the Gaussian curvature of a sphere is non-zero. A cylinder has curvature in only one direction, so the Gaussian curvature of a cylinder is zero. A cone is another example of a curved surface having zero Gaussian curvature. Many other curved surfaces have zero Gaussian curvature.

The following disclosure pertains to the formation of a 3D structure having a shape approximating that of a selected 3D curved surface (e.g. a paraboloid) having non-zero Gaussian curvature over a portion of the surface. As explained below, the structure may be formed of a plurality of thin straight 2D strips each having zero Gaussian curvature. The strips are simply deformed and aligned adjacent to one another to approximate the selected 3D curved surface. "Simple deformation" of a thin strip means that the Gaussian curvature of the strip remains zero after deformation. "Straight" means that when the strips are simply deformed to approximate the selected 3D curved surface, the strips' edges appear straight when the deformed strips are viewed from a preferred viewing direction.

Figure 1:
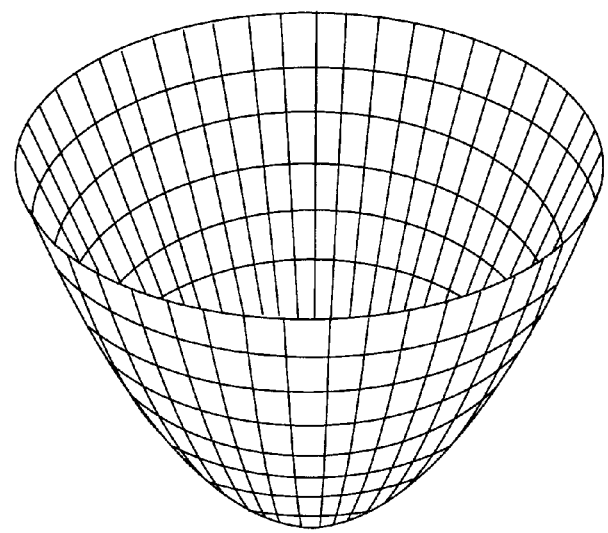
FIG. 1 schematically depicts a paraboloid.

A 3D curved surface having a desired shape, for example a light concentrating shape such as a paraboloid (i.e. the surface of revolution of a parabola as shown in FIG. 1), can be made from individual strips 10 of relatively inexpensive highly reflective material such as polished aluminum sheeting. Suitable material is available from Alanod Aluminium-Veredlung GmbH & Co. KG of Ennepetal, Germany under the trademark MIRO®.

Figure 2:
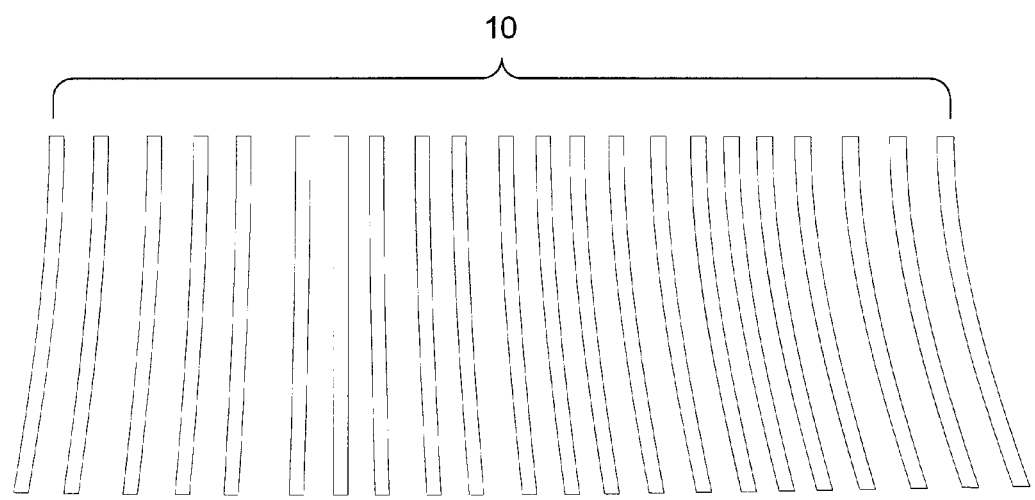
FIG. 2 schematically depicts a series of 2D strips that can be simply deformed and aligned adjacent one another to approximate a 3D curved surface.
Figure 3:
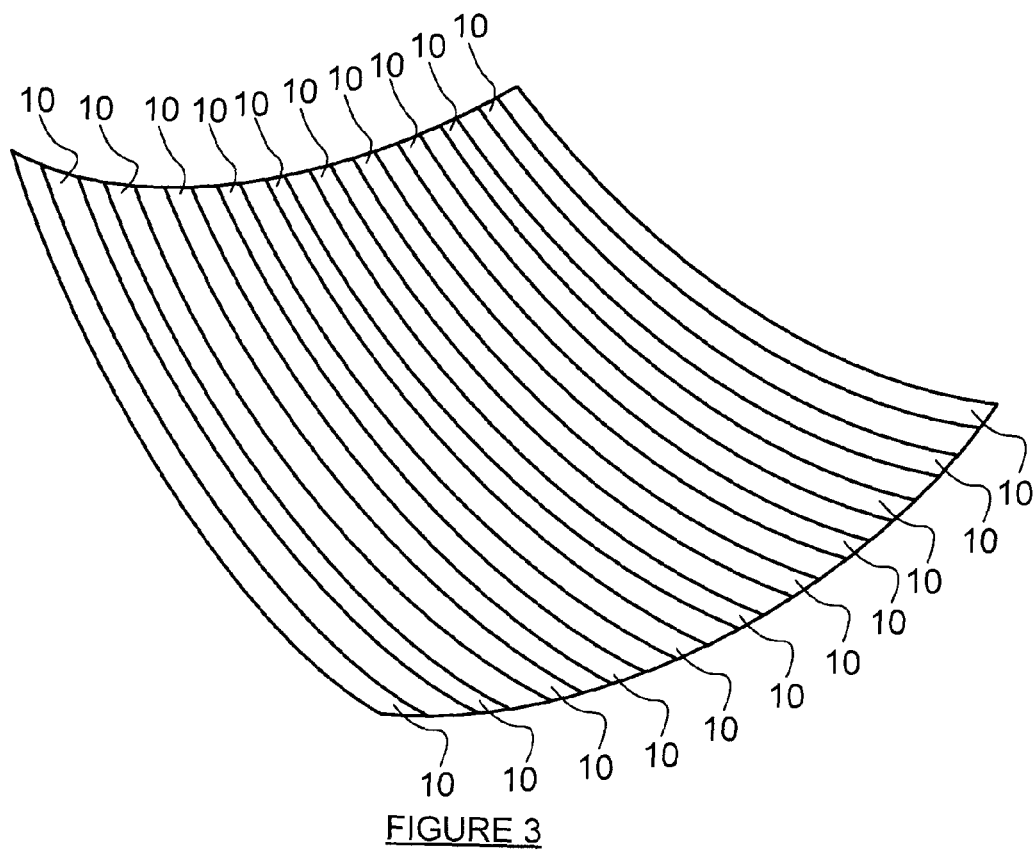
FIG. 3 schematically depicts a 3D approximation of a paraboloidal surface formed of simply deformed, aligned 2D strips.
Figure 4:
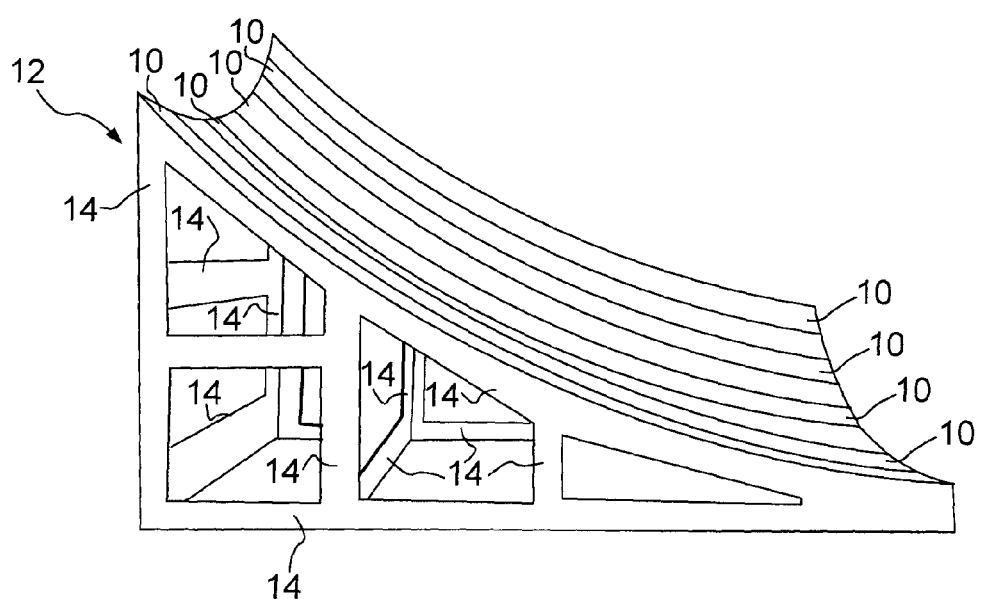
FIG. 4 is an oblique isometric schematic illustration showing the FIG. 3 strips mounted on a support frame.

Each strip 10 (FIGS. 2-4) has an optimal 2D shape such that, after simple deformation of strips 10, alignment of their adjacent edges, and attachment of the simply deformed, aligned strips 10 to a rigid frame 12 as shown in FIG. 4 and explained below, the desired continuous yet discrete 3D curved shape approximation is obtained.

Since the strips are only simply curved, each strip remains flat in one direction. Consequently, the 3D curved shape approximation formed by the simply deformed strips will have a plurality of flat facets, with each strip forming one facet. The width of each strip 10 should be sufficiently small that placement of the flat strips adjacent one another approximates the desired curved surface shape sufficiently well that the angular error associated with the discrete, flat strip size is less than a maximum error. For example, consider the situation in which a parabolic surface is approximated by a small number of wide strips, e.g. the extreme case in which only two wide strips are used. The 3D curved shape approximation formed by the two wide strips will clearly deviate substantially from the ideal parabolic curve being approximated, resulting in a large angular error. In contrast, a larger number of narrower strips will more accurately approximate the ideal parabolic curve, resulting in a small angular error. More generally, if the desired curved surface shape is a paraboloid to be used as a mirror, the maximum error will depend on the desired optical efficiency of the system in which the mirror is to be incorporated. Suitable results (i.e. an angular error of less than a 1° maximum error) can typically be obtained with a strip width no greater than 5% of the mirror width.

Strips 10 should also have roughly uniform width. In the case of the paraboloid-approximating strips 10 shown in FIGS. 2-4, the strip width is uniform (i.e. there is no variation in width along the length of any of strips 10). However, strips used to approximate other curved surface shapes may have a strip width which varies by no more than ±10% along a longitudinal axis of the strip.

If the strips have roughly uniform width then one may select an optimal strip width which is both sufficiently small to approximate the desired curved shape, and sufficiently large to be practical. For example, if the paraboloid approximating strips shown in FIGS. 2-4 have a very small strip width then simple deformation of the strips will approximate a paraboloid quite accurately. However, formation of a paraboloid approximation using such strips may be impractical in view of the need to fabricate, manipulate, mount and bond a relatively large number of strips as explained below. Moreover, increasing the number of strips by decreasing the strip width increases the number of gaps or seams between adjacent strips. Since the gaps or seams are substantially non-reflective, the mean reflectance of a paraboloidal mirror approximation formed of reflective strips decreases in proportion to the strip width. Increasing the number of strips by decreasing their width is also likely to increase costs by increasing the time and hence labour cost required to fabricate, manipulate, mount and bond the strips as explained below.

The length of each strip should be much greater than (e.g. more than 5 times) the width of the strip, so that the strip will provide a good approximation of the desired 3D curved surface when the strip is simply deformed. The thickness of each strip should be very substantially less than the length or width of the strip such that each strip can be simply deformed into the desired shape. For example, strips of 0.5 mm thick aluminum are easily simply deformed to approximate a mirror roughly 1 meter in extent and having a focal length of roughly 1 meter.

Each strip has a predetermined flat shape such that, after the strips are simply deformed and aligned, adjacent edges of adjacent strips are substantially parallel and separated by a substantially small gap. The "flat shape" of a curved surface having zero Gaussian curvature means the shape that the surface has when the surface is simply deformed into a plane. "Substantially parallel and separated by a substantially small gap" means that the strips, not the gaps, constitute most of the 3D curved surface approximation.

The desired 3D shape of each strip (i.e. the shape into which each strip will be simply deformed when the strip is used to approximate part of the selected 3D curved surface) can be determined using standard geometrical techniques. For example, in the case of the paraboloid approximating strips shown in FIGS. 2-4, optics techniques commonly used in lens design can be used to calculate the shape of each strip, and the calculation results can be confirmed by computer ray trace simulations. An arrangement of somewhat parallel lines, separated by distances selected to define suitable strip widths as described above, is then mathematically projected from a predetermined perspective onto a theoretically "perfect" mathematical model of the desired 3D curved surface. The projected lines describe curved lines on the surface which correspond to the edges of the strips required to approximate desired 3D curved surface. The projected lines need not be parallel, but this may be preferred for example to simplify mathematical determination of the desired shape of the strips, or to attain a more aesthetically desirable appearance.

A paraboloidal or other 3D curved surface can thus be constructed using sheet material that can easily be cut to the correct shape using well known water jet or die cutting techniques. As shown in FIG. 4, strips 10 can be mounted on a suitable support frame 12 having a plurality of support ribs 14 sufficiently thick to be capable of maintaining the desired 3D curved shape. For example, ribs 14 may be formed of ⅛ inch (≈0.3 cm) thick aluminum. Ribs 14 are formed with the appropriate curvature such that strips 10 will be simply deformed into the correct shape when they are mounted on and attached to ribs 14. Strips 10 should be sufficiently thick and/or ribs 14 should be sufficiently numerous to permit strips 10 to be simply deformed into the correct shapes without distorting the strips' shapes at their points of attachment to ribs 14 (i.e. it should be easy to deform strips 10, but the strips should not sag or otherwise depart from their desired curvature where they extend across gaps between ribs 14). Adjacent edges of adjacent ones of the simply deformed aligned strips can be bonded together using tape, silicone sealant, rivets, or other similar means or some combination thereof. For example, strips 10 can be initially and temporarily held in place on frame 12 with tape until the desired simple deformation and edge alignment of the strips is attained, then silicone sealant can be used to more permanently bond the strips to frame 12.

The simply deformed, aligned strips can be attached to rigid support frame 12 at selected mounting points such that natural equilibrium deformation between the mounting points holds the simply deformed, aligned strips in a desired approximation of the selected 3D curved surface.

Figure 5:
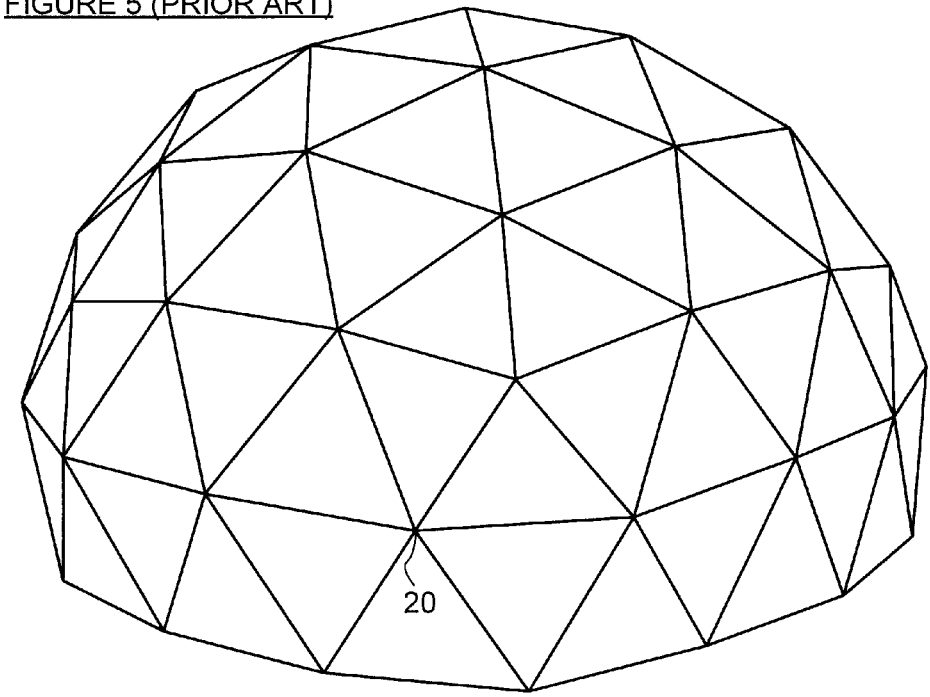
FIG. 5 schematically depicts a prior art geodesic dome.
Figure 6:
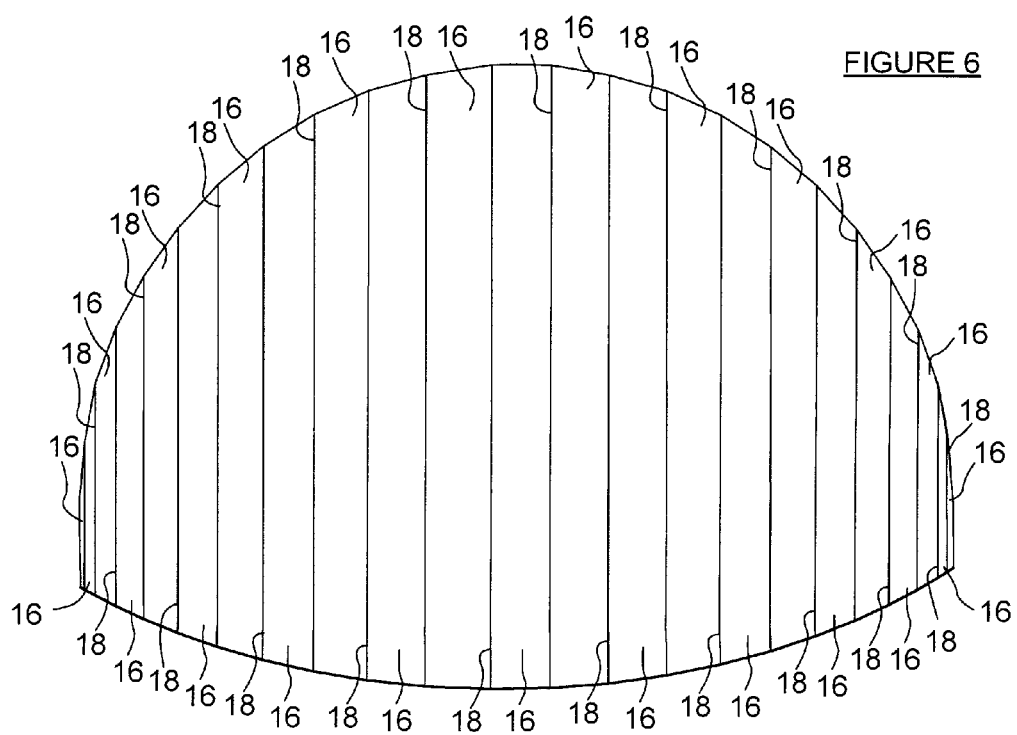
FIG. 6 schematically depicts a 3D approximation of a spherical surface formed of simply deformed, aligned 2D strips.

Other 3D shape approximations, such as architectonic shapes suitable for building construction can be formed. For example, the selected 3D curved surface may approximate a spherical, hemi-spherical or semi-spherical surface. Geodesic domes have been used to approximate such spherical surfaces in architectonic applications. Geodesic domes are typically formed by interconnecting a plurality of triangular-shaped members (e.g. as shown in FIG. 5) or by interconnecting other suitably shaped members. As shown in FIG. 6, a series of 2D strips 16 can be simply deformed and aligned to more accurately approximate a spherical, hemi-spherical or semi-spherical surface. A 3D spherical surface approximation formed of a series of 2D strips as shown in FIG. 6 requires only one seam, e.g. as illustrated at 18, between each adjacent pair of strips, eliminating seam intersections as illustrated at 20 in FIG. 5. 2D strips 16 may be fabricated by a continuous extrusion procedure so as to provide interlockable seams 18 along the opposed longitudinal edges of each strip 16. A 3D structure formed of 2D strips having such seams is likely to be more weather tight than a structure having intersecting seams, and may also be more aesthetically appealing in some situations.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A three-dimensional structure approximating a selected three-dimensional curved surface having non-zero Gaussian curvature over a portion of the surface, the structure comprising a plurality of simply deformed thin strips aligned adjacent one another to approximate the selected three-dimensional curved surface, wherein each strip has zero Gaussian curvature both before and after the strip is simply deformed and wherein each strip forms a non-annular portion of the curved surface after the strip is simply deformed.

2. A three-dimensional structure as defined in claim 1, wherein each strip has a strip width which varies by no more than ±10% along a longitudinal axis of the strip.

3. A three-dimensional structure as defined in claim 2, wherein each strip has a predetermined flat shape such that, after alignment of the simply deformed strips, adjacent edges of adjacent strips are substantially parallel and separated by a substantially small gap.

4. A three-dimensional structure as defined in claim 3, wherein the aligned simply deformed strips are attached to a rigid support at selected mounting points such that natural equilibrium deformation between the mounting points holds the aligned simply deformed strips in a desired approximation of the selected three-dimensional curved surface.

5. A three-dimensional structure as defined in claim 2, wherein after alignment of the simply deformed strips, the strips appear straight when viewed from a preferred viewing direction.

6. A three-dimensional structure as defined in claim 5, wherein the aligned simply deformed strips are attached to a rigid support at selected mounting points such that natural equilibrium deformation between the mounting points holds the aligned simply deformed strips in a desired approximation of the selected three-dimensional curved surface.

7. A three-dimensional structure as defined in claim 5, wherein:
   each strip has a predetermined flat shape such that, after alignment of the simply deformed strips, adjacent edges of adjacent strips are substantially parallel and separated by a substantially small gap; and
   the aligned simply deformed strips are attached to a rigid support at selected mounting points such that natural equilibrium deformation between the mounting points holds the aligned simply deformed strips in a desired approximation of the selected three-dimensional curved surface.

8. A three-dimensional structure as defined in claim 5, wherein:
   the strips are formed of a reflective material;
   each strip has a predetermined flat shape such that, after alignment of the simply deformed strips, adjacent edges of adjacent strips are substantially parallel and separated by a substantially small gap; and
   the selected three-dimensional curved surface has a light concentrating shape.

9. A three-dimensional structure as defined in claim 2, wherein the aligned simply deformed strips are attached to a rigid support at selected mounting points such that natural equilibrium deformation between the mounting points holds the aligned simply deformed strips in a desired approximation of the selected three-dimensional curved surface.

10. A three-dimensional structure as defined in claim 2, wherein:
    the strips are formed of a reflective material; and
    the selected three-dimensional curved surface has a light concentrating shape.

11. A three-dimensional structure as defined in claim 1, wherein each strip has a predetermined flat shape such that, after alignment of the simply deformed strips, adjacent edges of adjacent strips are substantially parallel and separated by a substantially small gap.

12. A three-dimensional structure as defined in claim 11, wherein:
    the strips are formed of a reflective material; and
    the selected three-dimensional curved surface has a light concentrating shape.

13. A three-dimensional structure as defined in claim 1, wherein the aligned simply deformed strips are mounted on a rigid support.

14. A three-dimensional structure as defined in claim 1, wherein:
    the strips are formed of a reflective material;
    adjacent edges of adjacent ones of the aligned simply deformed strips are bonded together; and
    the selected three-dimensional curved surface has a light concentrating shape.

15. A three-dimensional structure as defined in claim 1, wherein:
    the strips are formed of a reflective material;
    the aligned simply deformed strips are attached to a rigid support at selected mounting points such that natural equilibrium deformation between the mounting points holds the aligned simply deformed strips in a desired approximation of the selected three-dimensional curved surface; and
    the selected three-dimensional curved surface has a light concentrating shape.

* * * * *